Patented May 15, 1934

1,959,179

UNITED STATES PATENT OFFICE 1,959,179

MOLD

Foster Dee Snell, Brooklyn, N. Y., assignor to Essex Foundry, New York, N. Y., a corporation of New Jersey No Drawing. Application February 5, 1932, Serial No. 591,236

5 Claims. (Cl. 22—188)

My invention relates to a novel composition of matter adapted for many uses, but in particular for the production of forms, molds, and other objects resistant to heat.

In the casting of iron in a foundry a mold is used to contain the molten liquid until such time as it shall have congealed or set. The molds in use up to this time are of two definite types. One of these is made of sand, which is formed, used once, broken down, and then the sand is used again for a new mold. This has several objections. There is the cost and inconvenience of working the sand over each time. New binder must be added to it at frequent intervals. A new mold must be made each time. The other type of mold consists of an iron or steel form which is coated with graphite and used for casting. The high heat conductivity of the iron or steel causes it to chill the outside of the casting and therefore produces a different type of casting from that obtained with a sand mold. This must therefore be annealed.

The object of my invention is to provide a composition of matter which may be used in the production of molds and other objects. When used for molds, the objectionable characteristics of both of the above types will be eliminated. To attain the above object a finely divided material is used as an aggregate, a material which has a low coefficient of expansion. The most promising materials are zirconium silicate and silicon carbide. These are commercially known under the names of zircon and carborundum. Other materials having a comparable coefficient of expansion can be used. With this refractory material there is mixed a binder which will react with it or with some material added to it to produce a permanent or semi-permanent bond. A suitable bond with silicon carbide can be obtained with sodium silicate which reacts to form compounds having a higher fusion point than the sodium silicate. Zirconium silicate can be used in a similar way by mixing with it a small amount of silicon dioxide or ground sand which will under proper conditions react with the sodium silicate to form a more silicious and therefore higher fusing silicate. Somewhat less satisfactory results can be obtained with other materials which react, such as sodium carbonate, etc.

When the typical mixture of silicon carbide and sodium silicate is used to form a mold, this is not destroyed when it has been used once, it does not so chill the metal as to give a hard surface to the casting, and in effect combines the merits of both types of molds.

In order to prepare a suitable mold, the following is a typical procedure, presented for illustrative purposes only, and intended to cover only one of many possible compositions and ratios.

Dilute a commercial sodium silicate having a ratio of sodium oxide to silicon dioxide of approximately 1:3.25 to a concentration of about 20% total solids. Mix 150 cc. of this material with 1100 grams of silicon carbide of a grade 100 mesh and finer. Use this damp mixture for preparation of a mold according to the usual foundry practice for tamping and pressing of said molds. Let the mold air dry about 24 hours. Subsequent to the air drying it is desirable to "set" the composition by baking in an oven at 500–550° F. Instead of following the usual foundry procedure, it is often convenient to form these molds in a press using hydraulic pressure. Pressures as high as 2000 pounds per square inch have been used in order to obtain very dense structures, the merit of high pressure being that the grain structure of the surface of the mold is better than that obtained with other procedures.

Before use, the surface of the mold may be coated with various materials such as have been used to prevent sticking to the surface of molds in general, and more particularly to the steel or "chill" molds.

Of course it will be understood that various modifications may be made in the ingredients and proportions thereof without departing from the spirit of the invention, as claimed.

I claim:

1. A mold designed for casting, comprising zirconium silicate, silicon dioxide, and sodium silicate, heated to cause setting by reaction.

2. A mold designed for casting and mainly consisting of refractory material of low coefficient of expansion selected from the group of such materials including zirconium silicate and silicon carbide, mixed with a binder of sodium silicate.

3. A mold designed for casting and mainly consisting of zirconium silicate mixed with a binder of sodium silicate.

4. A mold designed for casting and mainly consisting of zirconium silicate mixed with a binder of sodium silicate and silicon dioxde.

5. A mold designed for casting and mainly consisting of silicon carbide mixed with a binder of sodium silicate.

FOSTER DEE SNELL.